April 10, 1956 B. J. SHERWOOD 2,741,586

ELECTROPLATING METALS

Filed Jan. 12, 1953

*INVENTOR.*
BERT J. SHERWOOD

*BY* William P. Lane

ATTORNEY

United States Patent Office 2,741,586

Patented Apr. 10, 1956

2,741,586

ELECTROPLATING METALS

Bert J. Sherwood, Lakewood, Calif., assignor to North American Aviation, Inc.

Application January 12, 1953, Serial No. 330,745

4 Claims. (Cl. 204—45)

This invention concerns a method and means for electroplating, and more particularly a method and means for electroplating metals with bright deposits of metal.

It is customary to plate metals by passing a current through a plating solution wherein the negative electrode, or cathode, immersed in the solution is the base metal upon which the plated metal is to be formed. Ordinarily, a plated metal which is deposited by passing direct current through the plating solution does not deposit evenly upon the base metal because of the varying current densities across the surface of the metal and must, therefore, be ground and polished after it is plated.

In the past, it has been customary to connect an A.-C. voltage in series with the D.-C. voltage to partially deplate the heavier deposits during the peak of the negative half-cycle of the A.-C. voltage. The peak of the A.-C. voltage necessarily had to be greater than the D.-C. voltage. When the value of the D.-C. voltage or the amplitude of the A.-C. voltage was changed, not only the value of the peak negative voltage, during the negative half-cycle of the A.-C. voltage, was changed, but the time duration of the negative voltage was also changed. This required special calculations to determine the setting of the device to achieve a predetermined quantity of electric flow in a plating direction and a predetermined quantity of electric flow in a deplating direction. This invention contemplates the use of alternating plating current of asymmetric sine wave form. More particularly, this invention contemplates the use of an alternating plating current in which the amplitude of one half-cycle remains constant and the amplitude of the other half-cycle is varied at will without changing the time duration of either the positive or negative current flow. In the preferred embodiment of this invention the time duration of the flow of negative current is not dependent upon the amplitude of either the positive or negative half-cycle.

It is therefore an object of this invention to provide means for electroplating a uniform deposit of material upon a base material.

It is another object of this invention to provide a method for electroplating a uniform deposit of material upon a base material.

It is another object of this invention to provide a means for generating an asymmetric sine wave.

It is another object of this invention to provide a method for generating an asymmetric sine wave.

Figure 1:
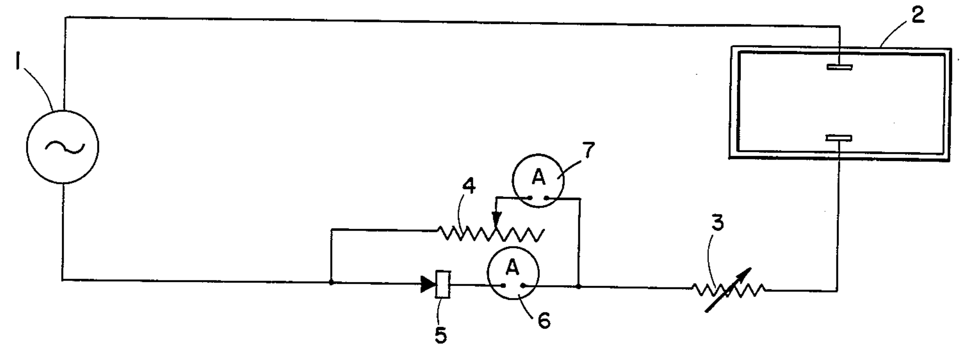
Figure 2:
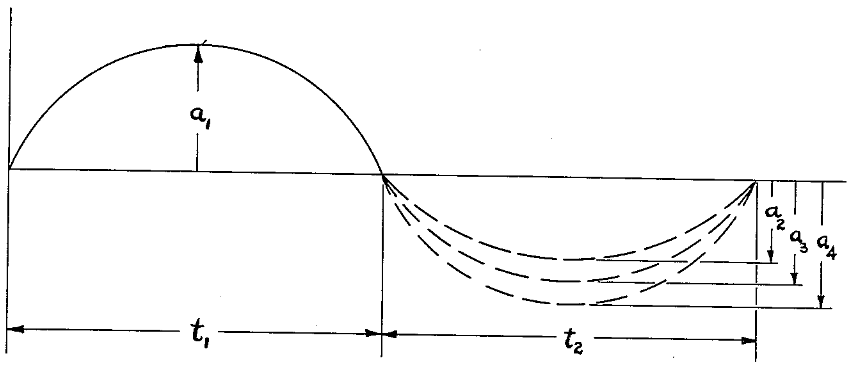

Other objects of invention will become apparent from the following description taken in connection with the accompanying drawings, in which Fig. 1 is a typical schematic circuit diagram of this invention;

And Fig. 2 is a graph of the current flow through the plating tank plotted as a function of time, in the preferred embodiment of this invention.

In Fig. 1, alternating current voltage source 1 is connected in series with plating tank 2, current limiting resistor 3, and the parallel combination of variable resistor 4 and rectifier 5. The current through rectifier 5 is measured by meter 6, while the current through resistor 4 is measured by meter 7.

In operation, a variable impedance device 3 such as an inductor, capacitor, or resistor limits the total flow of current through plating tank 2. During the positive half-cycle of the alternating current voltage, rectifier 5 operates as a closed switch, thus shorting variable resistor 4 and passing a current which is dependent upon the voltage of alternating current voltage source 1 and the resistance of resistor 3. During the negative half-cycle of the voltage of alternating current voltage source 1, rectifier 5 acts in the manner of an open switch, and the current amplitude is limited by an impedance device such as resistor 3 in series with an impedance device such as an inductor, capacitor, or resistor 4. In the preferred embodiment of this invention, elements 3 and 4 are resistors. Thus, the amplitude of the current flow during the negative half-cycle may be varied independently of the amplitude of the current flow during the positive half-cycle by changing the resistance of resistor 4. It may be seen from Fig. 2 that the time duration of the flow of negative current $t_2$ is equal to the time duration of the flow of positive current $t_1$, is independent of the amplitude of the voltage of alternating current voltage source 1, and depends merely upon the frequency thereof. A plating build-up occurs upon the cathode during the positive half-cycle of the plating current due to the area under the curve, with amplitude $a_1$; and a plating removal which is less than the build-up, proportional to the area under the curves of amplitude $a_2$, $a_3$, or $a_4$, occurs during the negative half-cycle of the plating current. The plating removal occurs primarily at the geometrical points of high current concentration upon the plated object and creates a smooth plated surface with a bright metal deposit.

Ammeter 6 reads the average unidirectional current during the plating half-cycle. Ammeter 7 reads the current through resistor 4 during the de-plating half-cycle. The time duration is the same on both the plating and de-plating half-cycles.

Although any plateable material can be plated by this process, typical examples of plating solutions and operating conditions are given below. For the current readings tabulated herein, meter 6 is a D.-C. meter and meter 7 is an A.-C. meter.

Silver—a high speed silver cyanide plating bath comprising:

| | |
|---|---|
| AgCN | 15 oz. avoirdupois. |
| KCN | 16 oz. avoirdupois. |
| $K_2CO_3$ | 2 oz. avoirdupois. |
| KOH | 1 oz. avoirdupois. |
| $H_2O$ to make 1 gallon of solution. | |

| | |
|---|---|
| Reading of meter 6 | 1.0 ampere. |
| Reading of meter 7 | 1.5 amperes. |
| Thickness of plate | 2 mils. |
| Bath temperature | 120° F. |
| Anode | Silver. |
| Area of sample | 6 square inches. |
| Elapsed plating time | 55 minutes. |

Copper—plating solution:

| | |
|---|---|
| $CuSO_4 \cdot 5H_2O$ | 26 oz. avoirdupois. |
| $H_2SO_4$ (96%) | 7 oz. avoirdupois. |
| $H_2O$ to make 1 gallon of solution. | |

| | |
|---|---|
| Bath temperature | Room temperature. |
| Anode | Electrolytic copper. |
| Area of sample | 3 square inches. |
| Elapsed plating time | 60 minutes. |
| Reading of meter 6 | 2.0 amperes. |
| Reading of meter 7 | 1.0 ampere. |
| Thickness of plate | 4.8 mils. |

Thus, the device of this invention produces a plated surface which is extremely smooth and has a minimum of surface build-up at points of high ion concentration.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A method for electroplating uniform deposits of material upon an electrode in a plating solution which consists of passing an alternating plating current of asymmetric sine wave form through said plating solution, the positive plating half cycle being greater than the negative de-plating half-cycle of said current in amplitude and being equal in time duration, whereby said metal is plated in a bright deposit upon a base metal.

2. A method for electroplating comprising passing an electric current consisting of an asymmetric sinusoidally alternating plating current, having a positive plating half-cycle and a negative de-plating half-cycle, through a base material, a plating solution, an an anode, the de-plating half-cycle being of the same time duration and being independently variable in amplitude with respect to the plating half-cycle, the negative amplitude being less than the positive amplitude.

3. In a method of controlling the electroplating of a metal on a base metal; the step which comprises depositing said metal on the base metal by a current consisting of an asymmetric alternating sine wave having a positive half-cycle of greater amplitude than the negative half-cycle, the time duration of said half-cycles being equal.

4. In a method of controlling the electroplating of a metal on a base metal; the steps which comprise depositing said metal on the base metal by the positive half-cycle portion of a current consisting of an asymmetric alternating sine wave and de-plating a portion of said deposited metal by the negative half-cycle portion of said current, said negative portion having an amplitude less than the amplitude of the positive portion, said negative amplitude being variable independently of the positive amplitude and the time duration of said half-cycles being equal.

References Cited in the file of this patent

UNITED STATES PATENTS

| | | |
|---|---|---|
| 1,918,605 | Jones | July 18, 1933 |
| 2,116,509 | Cottrell | May 10, 1938 |
| 2,515,192 | Chester | July 18, 1950 |